US012739454B2

(12) United States Patent
Sharma et al.

(10) Patent No.: US 12,739,454 B2
(45) **Date of Patent: *Sep. 15, 2026**

(54) SYSTEMS, METHODS, AND DEVICES FOR VIDEO STREAM SIGNAL ANALYSIS

(71) Applicant: Comcast Cable Communications, LLC, Philadelphia, PA (US)

(72) Inventors: Yashi Sharma, Highlands Ranch, CO (US); Kayhan Karatekeli, Centennial, CO (US); Michael Maldonado, Denver, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/802,909

(22) Filed: Aug. 13, 2024

(65) Prior Publication Data

US 2024/0406475 A1 Dec. 5, 2024

Related U.S. Application Data

(63) Continuation of application No. 17/247,287, filed on Dec. 7, 2020, now Pat. No. 12,096,051.

(51) Int. Cl.

| | |
|---|---|
| ***H04N 21/234*** | (2011.01) |
| ***H04L 65/70*** | (2022.01) |
| ***H04N 21/2343*** | (2011.01) |
| ***H04N 21/235*** | (2011.01) |
| ***H04N 21/2383*** | (2011.01) |
| ***H04N 21/44*** | (2011.01) |

(52) U.S. Cl.

CPC ......... *H04N 21/2383* (2013.01); *H04L 65/70* (2022.05)

(58) Field of Classification Search

None

See application file for complete search history.

(56) References Cited

U.S. PATENT DOCUMENTS

| | | | | |
|---|---|---|---|---|
| 7,394,850 | B1 | 7/2008 | Gordon | |
| 2002/0016961 | A1* | 2/2002 | Goode | H04N 21/218 382/104 |
| 2002/0061067 | A1 | 5/2002 | Lyons et al. | |

(Continued)

OTHER PUBLICATIONS

US Patent Application filed Dec. 7, 2020, entitled "Systems, Methods, and Devices for Video Stream Signal Analysis", U.S. Appl. No. 17/247,287.

*Primary Examiner* — Brian T Pendleton
*Assistant Examiner* — Jean D Saint Cyr
(74) *Attorney, Agent, or Firm* — BakerHostetler

(57) ABSTRACT

Systems, methods, and devices relating to video stream signal analysis are described herein. In a method, a first video stream configured with a first plurality of signals associated with inserting content may be determined. The first plurality of signals may be extracted from the first video stream and temporally compressed. A second video stream may be configured with the compressed first plurality of signals. Based on whether the compressed first plurality of signals caused any errors in processing the second video stream, it may be determined whether the uncompressed first plurality of signals are expected to cause any errors in processing the first video stream configured with the uncompressed first plurality of signals.

26 Claims, 5 Drawing Sheets

(56) References Cited

U.S. PATENT DOCUMENTS

| | | | | |
|---|---|---|---|---|
| 2010/0208819 | A1* | 8/2010 | Evans | H04N 19/467 375/E7.076 |
| 2012/0063636 | A1* | 3/2012 | Lienhart | H04N 21/8456 382/100 |
| 2017/0006319 | A1 | 1/2017 | Jones et al. | |
| 2017/0063319 | A1 | 3/2017 | Kondo et al. | |
| 2018/0343484 | A1 | 11/2018 | Loheide et al. | |

* cited by examiner

SYSTEMS, METHODS, AND DEVICES FOR VIDEO STREAM SIGNAL ANALYSIS

CROSS-REFERENCE TO RELATED APPLICATIONS

This application is a continuation of U.S. patent application Ser. No. 17/247,287, filed Dec. 7, 2020, now U.S. Pat. No. 12,096,051, issued Sep. 17, 2024, which is hereby incorporated by reference for any and all purposes.

BACKGROUND

A video transport stream often includes not only the video and audio data itself, but also various signals that indicate points in the stream at which an advertisement or other non-program content may be inserted. A cueing message formatted according to the SCTE-35 standard is one example of such a signal. For example, a content distributor may initially receive a stream from a content provider comprising signals at various points in the stream. The content distributor may recognize those signals and splice or otherwise insert advertisements into the stream accordingly before the stream is encoded and transmitted to a receiver for viewing. For example, a stream may comprise a nationally-televised program, with one or more segments of the program (e.g., a commercial break or portion thereof) being designated for replacement by local advertisements. Based on the signals in the stream, the content distributor may recognize a segment in the stream so designated and insert a local advertisement at that segment in the encoded stream that is sent to the receiver.

For a number of reasons, such as the content distributor's contractual advertising obligations and overall viewer satisfaction, the content distributor may be motivated to analyze (e.g., test and verify) the signals that are or will be included in the stream from the content provider. However, such analysis may present a number of challenges. For example, although content providers generally use signaling that complies with the SCTE-35 standard, there may be variations from provider to provider in how signaling data is presented and/or used in an SCTE-35 signal. Even with respect to a single content provider, there may be variations in signaling particulars depending upon whether the stream is for a weekday versus a weekend or for the month-end versus the beginning or middle of the month. A content provider may also use different signals during a holiday or special event (e.g., the Olympics). Content providers may also provide the signals of their stream according to different schedules (e.g., once a month, every two weeks, etc.). In addition, the sheer length of time (e.g., one or more days) of a subject stream may exacerbate the above challenges, making any analysis an arduous, time-consuming, and expensive endeavor.

These and other shortcomings are addressed in the present disclosure.

SUMMARY

Systems, methods, and devices relating to video stream signal analysis are described herein.

In a method, a first video stream, configured with a first plurality of signals associated with insertion of content into the first video stream, may be received. The first plurality of signals may relate to ad insertions, for example. The first plurality of signals may be extracted from the first video stream, or the first plurality of signals may be received from a database or other storage. The first plurality of signals may be temporally compressed such that the length of time covered by the compressed first plurality of signals is significantly less than that covered by the uncompressed first plurality of signals. The compressed first plurality of signals may be overlaid onto a second video stream. The initial signals of the second video stream associated with insertion of content may be removed. Configured with the compressed first plurality of signals from the first video stream, the second video stream may appear as the first stream to any downstream components. The second video stream and the compressed first plurality of signals may be processed by one or more downstream components to determine whether the compressed first plurality of signals caused any errors in processing the second video stream. Any such errors caused by the compressed first plurality of signals may be extrapolated to the first video stream and first plurality of signals to determine any errors (or lack thereof) in the first video stream and first plurality of signals.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF DRAWINGS

The accompanying drawings, which are incorporated in and constitute a part of this specification, illustrate embodiments and together with the description, serve to explain the principles of the systems, methods, and devices.

Aspects of the disclosure will now be described in detail with reference to the drawings, wherein like reference numbers refer to like elements throughout, unless specified otherwise.

DETAILED DESCRIPTION

Systems, methods, and devices relating to analyzing signals (e.g., ad insertion signals) of a video stream are described. To address, at least in part, the current challenges in video stream signal analysis (e.g., unwieldy stream length, inconsistent signals from provider to provider, frequent changes by providers, etc.), the techniques described herein enable signals in a subject video stream to be analyzed (e.g., by test personnel) in a fraction of the time previously possible. In addition to the improvements in performing a single analysis of a stream's signals, a database of signals extracted from various streams may be developed over time. The signals stored in the database may be the subject of later analysis. Indeed, a secondary stream used in analyzing a subject stream may be selected based on a later scheduled analysis of the secondary stream's signals. The database of signals may also be leveraged by personnel to again analyze a stream's signals. For example, an analysis may be performed again using different parameters or under new use cases.

In analyzing a subject stream, its signals associated with non-program content insertion (e.g., ad insertion) may be extracted from the subject stream, or those signals may be retrieved from the above-mentioned database if possible. The extracted signals at this point may still be configured to span a length of time equal to that of the subject stream, which may be excessively long. To help hasten the analysis, the extracted signals may be temporally compressed. The temporal compression may maintain the relative timing of the signals. For example, if several signals were initially spaced apart at 10-minute intervals, they may be spaced apart at 1-minute intervals instead after compression.

The compressed signals may be then overlaid onto a second stream, which may have a much shorter length than the subject stream, commensurate with the compression ratio. The initial signals in the second stream may be removed during this process and stored. Although the second stream so-configured is likely unwatchable to a human viewer due to the rapid cut-ins and outs of inserted video content (e.g., ads) caused by the temporal compression, the second stream effectively mimics or spoofs the subject stream when processed by any downstream components (e.g., a conditioner, encoder, packager, etc.). Thus, it may be reasonably expected that any errors (or lack thereof) from the downstream components in processing the second stream configured with the compressed signals may be similarly encountered with the subject stream. The signals of the subject stream may be adjusted (e.g., by test personnel) accordingly.

Although the techniques described herein may be variously presented in the context of testing the signals present in a video stream, the disclosure is not so limited. The techniques described herein may be applied to video stream signal analysis generally, including contexts beyond testing processes.

Figure 1:
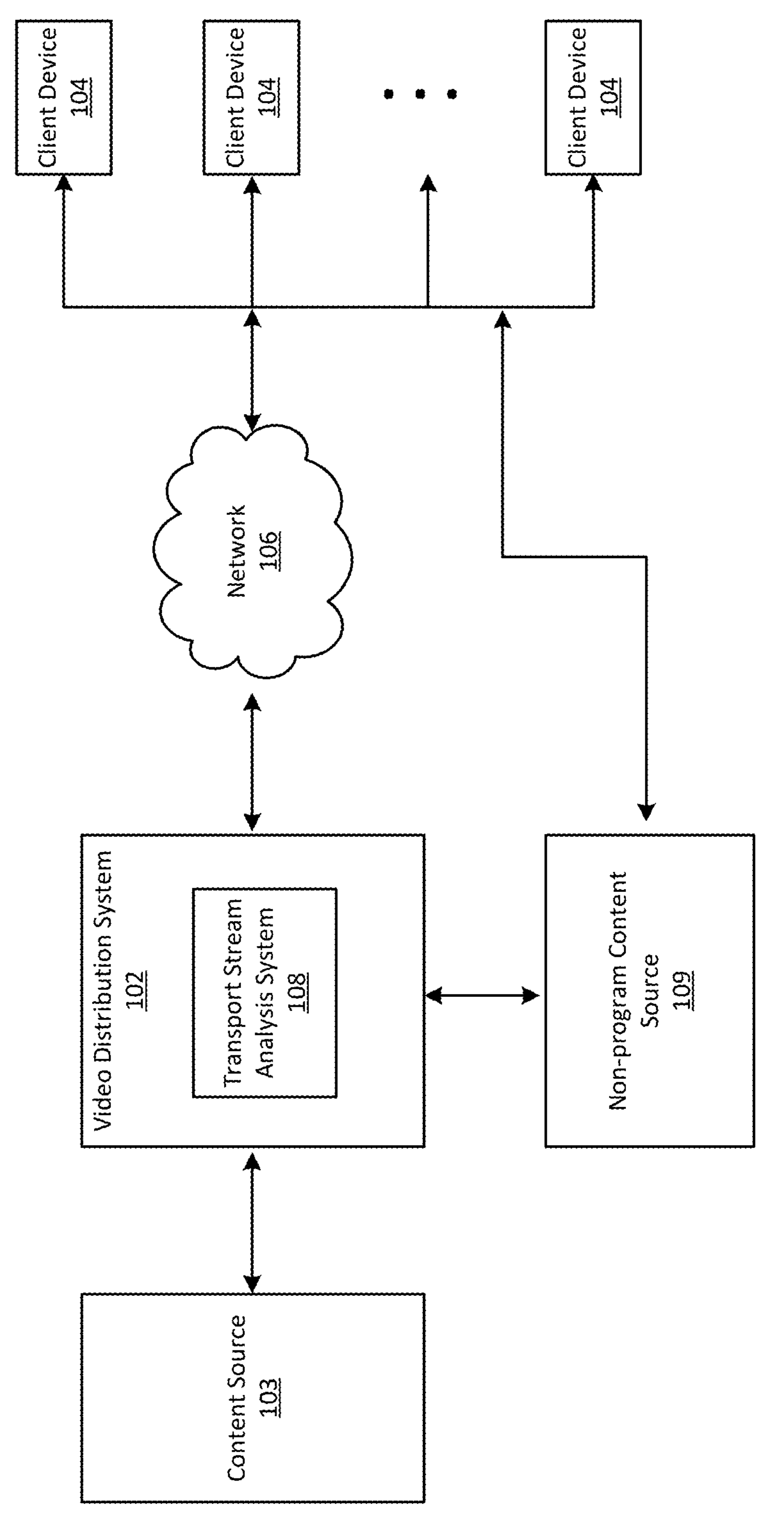
FIG. 1 is a block diagram of an example system.

FIG. 1 illustrates a block diagram of a system 100 in which the present systems, methods, and devices may be implemented. The system 100 comprises a video distribution system 102 that receives a video stream (also referred to variously herein as a "stream") from a content source 103. The video distribution system 102 may process the video stream from the content source 103 (e.g., insert ads, encode, package, etc.) and transmit the processed video to one or more client devices 104 for viewer consumption. An ad inserted into a video stream by the video distribution system 102 may be received from a non-program content source 109. A client device 104 may additionally or alternatively receive an ad from the non-program content source 109, such as in a client-side dynamic ad insertion scheme. The video distribution system 102 may further comprise a transport stream analysis system 108 configured to analyze a stream from the content source 103, particularly with respect to signals (e.g., cue messages) within the stream or otherwise associated with the stream. Such signals may be associated with insertion of non-program content into the stream that is ultimately transmitted to a client device 104.

A client device 104 may comprise any one of numerous types of devices configured to receive video data, such as an MPEG-2 transport stream, from the video distribution system 102 and decode the received video data for viewer consumption. The client device 104 may be further configured to perform various insertion functions, such as client-side ad insertion using ad content from the non-program content source 109. The ad selection may be based on a viewer profile associated with the client device 104. A client device 104 may request for and receive a video stream from the video distribution system 102 and/or the non-program content source 109 based on a manifest file provided by the video distribution system 102.

A client device 104 may comprise a display device, such as a television display. A client device 104 may comprise a computing device, such as a laptop computer or a desktop computer. A client device 104 may comprise a mobile device, such as a smart phone or a tablet computer. A client device 104 may be configured to receive video content and output the video content to a separate display device for consumer viewing. For example, a client device 104 may comprise a set-top box, such as a cable set-top box. A set-top box may receive video content via a cable input (e.g., co-axial cable or fiber optic cable) and format the received video content for output to a display device. A set-top box may receive video content via digital video streaming. A set-top box (or other type of client device 104) may comprise a quadrature amplitude modulation (QAM) tuner. A set-top box may comprise a digital media player or a gaming device.

A client device 104 may comprise a digital video recorder (DVR) that receives and stores video content for later viewing. Other client devices 104 may also implement features that allow received video content to be stored on the device for later viewing. A client device 104 may be in communication with a cloud DVR system to receive video content. A client device 104 may combine any features or characteristics of the foregoing examples. For instance, a client device 104 may include a cable set-top box with integrated DVR features. A client device 104 is not strictly limited to a video playback device, but may include a computing device more generally, regardless of whether it is capable of displaying video itself.

A client device 104 may refer to a software "client" in addition to or instead of a hardware device. In this sense, for example, a client device 104 may comprise a web browser, a media streaming application (e.g., installed on a mobile device), or the software installed in a set-top box. For example, a media streaming application may generate an HTTP request for a video object, receive the subsequent HTTP response with the video object, and decode the video object for viewing. A client device 104, whether hardware or software based, may be referred to as a receiver or receiver unit.

The video distribution system 102 may generally enable video content delivery to the client devices 104, such as via an encoded video transport stream. The video distribution system 102 may be associated with a content distribution entity. The video distribution system 102 may comprise a multichannel video programming distributor (MVPD) system, such as a cable or satellite television provider system. An MVPD system may deliver video content according to scheduled broadcast times (e.g., linear video delivery) and/or may implement video-on-demand services (e.g., OTT (over-the-top) video delivery). The video distribution system 102 may comprise a digital video streaming system. The video distribution system 102 may implement a cloud-based DVR system configured to deliver "recorded" video content upon request from a client device 104. The video distribution system 102 may comprise, at least in part, a content delivery network (CDN). Some portions of the video distribution system 102 may comprise part of a CDN and other portions of the video distribution system 102 may be external to the CDN.

The video distribution system 102 may receive a transport video stream or other form of video data from the content source 103. The content source 103 may be associated with a content provider. A content provider may comprise a television network and thus the associated video stream may comprise that television network's programming. A content provider may also be referred to in the industry as a programmer or network programmer. The video stream from the content source 103 may comprise a multi-program transport stream or a single program transport stream. A stream may comprise multiple individual video streams (representations) associated with the same content, but having different video profiles with respect to, for example, bitrate, compression, or encoding method. In practice, the video distribution system 102 may receive video streams from multiple content sources 103.

The video stream from the content source 103 may comprise one or more signals that indicate, generally, points or segments in the stream that are available for non-program content (e.g., ad) insertion by a content distributor, such as the video distribution system 102, or a client device 104. For example, the signals may indicate the start and end times of a segment available for non-program content insertion, as well as the content type of the non-program content to be inserted in the segment. The signals may additionally or alternatively indicate the start and end times of a "distributor placement opportunity" that comprises one or more consecutive segments that are available for insertion. "Insertion" may sometimes refer to replacement of existing non-program content in the stream with new non-program content, such as replacing a national ad previously inserted by a content provider with a local ad. The signals may additionally or alternatively indicate the start and end times of a program (e.g., a television program), the start and end times of any commercial breaks within the program, and the start and end times of the portions of the program (e.g., "chapters") that are between commercial breaks. The signals may comprise a metadata portion of the stream.

The transport stream analysis system 108 of the video distribution system 102 may generally analyze (e.g., test and verify) the signals, or a portion thereof, included in the video stream received from the content source 103. The signals may be analyzed to determine that they may be properly recognized and processed (e.g., with no errors) by various downstream components of the video distribution system 102 that prepare the video stream for transmission to the client devices 104. An incorrect signal may result in an incorrect ad—or even no ad—being shown in the associated segment of a video stream. An incorrect signal may also cause errors in a downstream component or even cause an interruption in processing the video stream. Such downstream components may, for example, convert or condition the signals to a normalized form specified by the video distribution system 102. The downstream components may package the video stream into a set of files and generate an associated manifest that identifies those files. The manifest may also identify one or more insertion points and associated non-program content files to request and play. The downstream components may encode the video stream based on the signals. For example, the video stream may be encoded to ensure that the frame of the program content immediately following the end frame of an ad segment is an I-frame. The downstream components may include an ad back office system that may perform functions relating to ad selection, ad targeting, ad placement tracking, etc.

To perform signal analysis of a subject video stream, the transport stream analysis system 108 may ingest the subject stream from the content source 103. The subject stream may comprise a plurality of signals relating to non-program content insertion, such as an ad start time and an associated ad end time. The transport stream analysis system 108 may capture (e.g., record) these signals and their associated timing information. The captured signals may initially be in a certain temporal relationship to each other according to their respective timing information. In preparation for analysis, the captured signals may be temporally compressed. For example, the compressed temporal relationships between the signals may be proportional to their initial uncompressed temporal relationships. As an example, the signals of the subject stream may span a full week of the subject stream. In compressed form, the signals may span only one hour. To test the signals, they may be added (e.g., overlaid into or embedded in) a second video stream having a length that corresponds to that covered by the compressed signals. In the aforementioned example, the week's worth of signals may be overlaid into a one-hour (second) video stream. Although the resultant second video stream with the compressed signals may be jumbled to the human eye (e.g., due to accelerated cut ins/outs of inserted ads or other non-program content), the downstream components of the video distribution system 102 (or corresponding components designated for use in signal testing) may process the second video stream as if it were a normal live stream. The processing by the downstream components may be observed for any errors in the signals.

In addition, during the process of overlaying the signals from the subject stream into the second stream, the original signals in the second stream may be recorded and stored for later use. For example, those signals may be also subjected to analysis in a similar manner by overlaying those signals into a third stream. The selection of the second stream may be done in a calculated manner based on knowledge of planned future signal analysis. In this example, it may have already been known that the signals of the second stream were to be subsequently analyzed and the second stream may have been selected accordingly.

The non-program content source 109 may provide the various ads and other non-program content that are inserted into a video stream. For example, in server-side ad insertion, the video distribution system 102 may request for and receive an ad from the non-program content source 109 for insertion into a video stream before it is transmitted to a client device 104. The requested-for ad may have been identified in a signal in the video stream. Additionally or alternatively, in client-side ad insertion, a client device 104 may request for and receive an ad from the non-program content source 109 for playback at the specified point in the video stream. The client device 104 may request the ad based on a manifest for the video stream stored on the client device 104.

In accordance with the broad meaning afforded herein to the term "ad", the non-program content source 109 may additionally or alternatively provide other insertable content besides a per se commercial advertisement, such as a local news segment, an emergency alert, a local traffic or weather report, a promotional segment for a television series or program of the local network, or a station identifier, all of which may be identified as non-program content. Unless clearly indicated otherwise, "ad" and "non-program content" may be used interchangeably. A video stream provided by the content source 103 may comprise "program content." It is noted that the video stream from the content source 103 may also include non-program content, such as a national ad that was already inserted into the video stream. Program content may comprise, for example, a television show, a news program (e.g., a half-hour news program, as opposed to an insertable, often short, news segment), a movie, or a sporting event.

The network 106 may comprise a private portion. The network 106 may comprise a public portion, such as the Internet. The network 106 may comprise a content distribution and/or access network. The network 106 may comprise a cable television network or a content delivery network. The network 106 may facilitate communication via one or more communication protocols. The network 106 may comprise fiber, cable, or a combination thereof. The network 106 may comprise wired links, wireless links, a combination thereof, and/or the like. The network 106 may comprise routers, switches, nodes, gateways, servers, modems, and/or the like.

Figure 2:
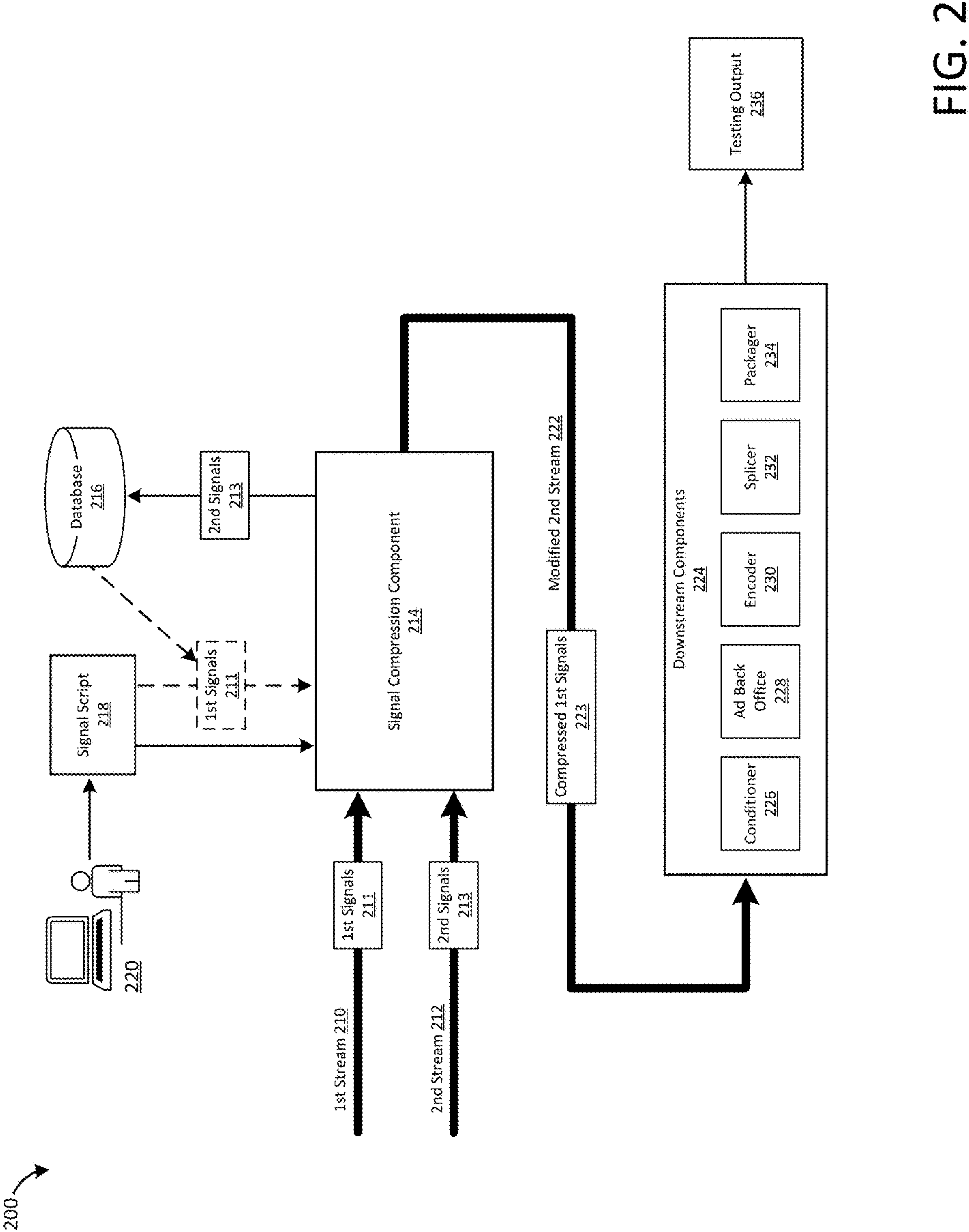
FIG. 2 is a block diagram of an example system and data flow.

FIG. 2 illustrates a block diagram 200 of an example system and data flow for analyzing (e.g., testing) signals embedded in a subject video stream, i.e., a first stream 210. This analysis may be performed in anticipation of later processing (e.g., encoding, conditioning, packaging, etc.) the first stream 210, or portion thereof, for transmission to client devices (e.g., the client devices 104 of FIG. 1) for viewer consumption. The first stream 210, including its embedded first signals 211, may be modified or corrected according to the results of this analysis before the first stream 210 is transmitted to client devices. The system and data flow may be implemented, at least in part, by the video distribution system 102 and/or the transport stream analysis system 108 of FIG. 1. The first stream 210 and other relevant streams (e.g., a second stream 212) may be received from the content source 103 of FIG. 1. Additionally or alternatively, the first stream 210 and other relevant streams (and/or signals thereof) may be stored internally in a database 216. The non-program content source 109 of FIG. 1 may provide ads or other non-program content for insertion into a stream during the signal analysis process.

As noted, the first signals 211 of the first stream 210 may be the subject of the video signal analysis. The analysis may also make use of the second stream 212 into which a temporally compressed version of the first signals 211 may be inserted, as will be described in detail herein. The first and/or second streams 210, 212 may each comprise a transport stream (e.g., an MPEG-2 transport stream) or at least a portion of a transport stream. For example, the first and/or second streams 210, 212 may each be one of several streams of respective transport streams. For example, a transport stream may be configured for adaptive bitrate streaming and the first and/or second streams 210, 212 may be one of several representations (e.g., with respect to bitrate, resolution, frame rate, encoding method, etc.) of the respective transport streams' content. In the case of adaptive bitrate streaming, the constituent streams of an adaptive bitrate set may have identical signals, so any analysis results of one stream may be applied, at least in part, to the other streams of the set as well.

It is contemplated that the first stream 210 and the second stream 212 may be associated with different content providers, although this is not necessarily required. For example, the first stream 210 may be associated with (e.g., comprises content of) a first television network or channel and the second stream 212 may be associated with (e.g., comprises content of) a second television network or channel. The second stream 212 may be selected according to a later planned analysis of the signals of the second stream 212. Thus the second signals 213 of the second stream 212 may be saved in the database 216 for the planned analysis of the second signals 213 (or for other reasons). The second stream 212 may instead be selected arbitrarily with respect to its content. In either case, the second stream 212 may be selected (and/or edited) so that its length is significantly less than that of the first stream 210. The length ratio between the second stream 212 and the first stream 210 may be the same as the compression ratio later used to compress the first signals 211.

The first and/or second signals 211, 213 may relate generally to content switching within the respective first and second streams 210, 212. The signals may often relate to non-program content insertion, but are not so limited. For example, in a manner similar to that used to indicate the start and stop times of an ad, signals may indicate the start and stop times of a program as a whole so that the stream may switch from this program to a second program, an ad, or other type of content at the appropriate time. As another example, signals may indicate that an initial program in a stream is eligible for replacement with a local program by a distributor.

A signal (e.g., the first and/or second signals 211, 213) may comprise an insertion message, for example. An insertion message may identify a point in a stream at which an ad or other type of content should or may be inserted (e.g., a start time). A second signal may comprise a second insertion message indicating a second point in the stream at which the ad is to end (e.g., an end time). SCTE-35 describes such points as a "splice point" at which a stream may switch constituent elementary streams from one source to another source. For example, a stream may switch from a program content source to a specified ad source at a first splice point and later switch from the ad source back to the program content source at a second, subsequent splice point.

Additionally or alternatively, the first and/or second signals 211, 213 may enable content insertion and switching by defining various nested segments within the respective first and/or second streams 210, 212. As some examples, types of segments may include a program, a segment available for ad insertion, a segment in which an existing ad may be replaced by another ad, an ad break comprising multiple ad segments, a chapter of a program between ad breaks, a distributor placement opportunity comprising one or more ad segments in which a content distributor may insert an ad or replace an existing one, or a promo segment within an ad break showing promotional material for a content provider's other programming. The above segments may be identified via an insertion message or other type of message in a signal. It will be noted that a segment in this context is distinct from the segments referred to in the context of adaptive bitrate streaming to a client device.

The first and/or second signals 211, 213 may indicate various other information relating to an insertion or segment message in the signal, such as a unique identifier of the associated ad (or other content, including program and non-program content), a storage location of an ad, a content type of an ad, a duration of an ad, a duration of a segment, hierarchy or tiering information, or timing information (e.g., presentation timestamp (PTS) adjustment or time synchronization information). The first and/or second signals 211, 213 may comply with the SCTE-35 signaling standard. The first and/or second signals 211, 213 and/or data contained therein may be converted to other signal formats at various stages of the analysis process, such as signal formats complying with SCTE-30, SCTE-130, SCTE-214, SCTE-224, SCTE-236, and/or SCTE-250 standards. For example, a downstream component may communicate with an ad server via a message complying with the SCTE-30 standard. The first and/or second signals 211, 213 may also be converted to a normalized format used by the particular video distribution system.

Based on a signal script 218, a signal compression component 214 may ingest the first and second streams 210, 212 and their respective first and second signals 211, 213. Additionally or alternatively, based on the signal script 218, the first signals 211 may be provided directly to the signal compression component 214 from the database 216. For example, the first signals 211 may have already been extracted from the first stream 210 and stored in the database 216. In this case, it may not be necessary to have or use the intact first stream 210.

The signal script 218 may define one or more parameters for the analysis process. For instance, the signal script 218 may identify a subset of signals out of the total signals in the first stream 210 for analysis. For case of description, the first signals 211 may refer to this subset, where applicable. For example, the signal script 218 may indicate that signals relating to insertions/replacements available to the distributor be analyzed, while signals relating to ads or other non-program content already inserted into the first stream 210 are to be excluded from the analysis. As another example, the signal script 218 may indicate that all signals relating to non-program content insertion/replacement are to be analyzed, while signals relating to program content (e.g., start/end times of a program or chapter of a program) are to be excluded from analysis. The signal script 218 may be determined based on input to a computing device 220 by a lab test engineer or other personnel associated with the content distributor.

The signal compression component 214 may extract the first signals 211 from the first stream 210. This may be performed according to the signal script 218. Although not shown in FIG. 2, the extracted first signals 211 may be stored in the database 216 for later reference or further analysis. At this point in the process, the extracted first signals 211 may be in the same temporal configuration as before extraction. For example, the extracted first signals 211 may have the same original timing information, such as the original start and end times for ad insertions or segments.

The signal compression component 214 may temporally compress the extracted first signals 211 to determine (temporally) compressed first signals 223. The compression may be based on the signal script 218. The temporal compression may be with respect to a temporal configuration of the first signals 211, such as the various insertion or segment start times, end times, lengths, durations, or the like indicated in the first signals 211. The compressed first signals 223 may be compressed in a manner that retains the same temporal relationships (e.g., proportions) between signals as they were in the original, non-compressed first signals 211. For example, and assuming a 4:1 compression ratio, if the original first signals 211 had insertions points (in minutes and seconds and relative to a program start) at 10:00, 11:00, 20:00, and 22:00, the compressed first signals 223 may have corresponding insertions points at 2:30, 2:45, 5:00, and 5:30, respectively. The same may apply for any insertion or segment lengths or durations. For example, and again with a 4:1 compression ratio, a two-minute insertion or segment length may be compressed down to 30 seconds. In practice, timing information may be given with far greater precision. Timing information may also be given as specific rather than relative times, although the same concepts apply. Although the above examples use a compression ratio of 4:1, it is possible that much higher compression ratios be used. The compression of the first signals 211 may be achieved by setting or modifying the various insertion or segment start times, end times, lengths, durations, or other timing information in the compressed first signals 223 accordingly.

To enable analysis of the compressed first signals 223, the compressed first signals 223 may be overlaid onto the second stream 212 to determine a modified second stream 222. Overlaying the compressed first signals 223 onto the second stream 212 may comprise embedding the compressed first signals 223 into the second stream 212. Either as part of the process to overlay the compressed first signals 223 or as a separate process, the signal compression component 214 may extract and delete the second signals 213 from the second stream 212. That is, the second signals 213 may be replaced in the second stream 212 with the compressed first signals 223 to determine the modified second stream 222. The extracted second signals 213 may be stored in the database 216 for subsequent reference or analysis. For example, it may be planned for the second signals 213 to be later analyzed and those signals may be retrieved from the database 216 rather than having to extract them from the second stream 212 again. The second stream 212 may have been selected for use in the instant analysis scenario for this very reason.

Additionally or alternatively, what is referred to as the modified second stream 222 may be a new stream generated, for example, by the signal compression component 214. This new stream may comprise the compressed first signals 223. Additionally or alternatively, the compressed first signals 223 may be re-inserted into at least a portion of the first stream 210 (e.g., with the original first signals 211 having been removed from first stream 210) to determine what is referred to as the modified second stream 222.

The modified second stream 222, whether before or after any downstream processing, is not intended for human viewing. Rather, the modified second stream 222 may be largely unintelligible by a human viewer due to the rapid cut-ins and cut-outs of ads or the like caused by the compression of the first signals 211. However, from a signaling perspective, the modified second stream 222 may be processed by any downstream components as if it was just a normal stream.

To analyze the original first signals 211, the modified second stream 222 with the overlaid compressed first signals 223 may be input to and processed by one or more downstream components 224. A downstream component may refer to any component, unit, module, program, hardware appliance, or similar that may be used at least at some point in the end-to-end process of delivering video to a client device for viewing, including from the point of receiving the video stream from a content provider and up until that video is transmitted to the client device. For example, the downstream components 224 may include a conditioner 226, an ad back office component 228, an encoder 230, a splicer 232, and a packager 234. The downstream components 224, at least in part, may be the same production downstream components that are used to process video for delivery to client devices for viewing. Additionally or alternatively, the downstream components 224, at least in part, may be dedicated to testing or other analysis, but are otherwise analogous to those used in production.

It will be understood that the compressed first signals 223 may be modified with respect to form, format, and/or constituent data as it is processed by one or more of the downstream components 224, but the modified signals resulting from such processing may still be considered as the compressed first signals 223. For example, via the ad back office component 228, the compressed first signals 223 may be modified to indicate a specific ad and its storage location. As another example, the compressed first signals 223 may be represented in a manifest generated by the packager 234 rather than being directly embedded in the modified second stream 222 at that point during analysis.

The conditioner 226 may parse a stream's signals and then normalize those signals according to a pre-determined specification. The normalization may include modifying signals themselves, deleting signals, and/or adding signals. For example, a content provider may include signals for ad start and end times, but not ad duration or ad information. The conditioner 226 may normalize the signals by modifying existing signals and/or adding new signals to indicate the missing ad duration and ad information. The normalization specification implemented by the conditioner 226 may be specific to an instant content distributor. A stream output by the conditioner 226 may be considered a conditioned stream.

The ad back office component 228 may generally address the business aspects of ad delivery. For example, the ad back office component 228 may interact with (or itself comprise) various ad providers, ad brokers, metric trackers, and/or similar systems or entities involved in ad delivery. For example, a signal may indicate a segment of a stream that is available for ad insertion. The ad back office component 228 may recognize this signal and determine an appropriate ad for insertion in the segment. The ad back office component 228 may modify the signal to identify the determined ad and indicate its location (e.g., a URL).

The encoder 230 may encode the modified second stream 222. The compressed first signals 223 in the modified second stream 222 may have been already conditioned by the conditioner 226 and/or modified with additional ad information from the ad back office component 228 by the time the modified second stream 222 is input to the encoder 230. The encoder 230 may encode the modified second stream 222 according to, for example, the MPEG-2 Part 2 (H.262) standard, the Advanced Video Coding (H.264) standard, or High Efficiency Video Coding (H.265) standard. The encoder 230 may additionally or alternatively encode any available ads or other non-program content that are to be spliced into the modified second stream 222. The encoder 230 may output an elementary stream (e.g., an MPEG elementary stream).

The splicer 232 may splice one or more ads or other non-program content indicated by the compressed first signals 223 into the modified second stream 222. This may comprise splicing an elementary stream comprising an indicated ad into the elementary stream of the modified second stream 222. The ad may be spliced into the elementary stream of the modified second stream 222 beginning at a start time (e.g., a splice In Point) indicated in an associated signal in the compressed first signals 223 and ending at an end time (e.g., a splice Out Point) indicated in this same signal or another associated signal in the compressed first signals 223.

The packager 234 may package the modified second stream 222 for (hypothetical) delivery to client devices for viewer consumption. The modified second stream 222 input to the packager 234 may comprise ads or other non-program content already spliced into the modified second stream 222 by the splicer 232, such as in a server-side ad insertion approach. Or the modified second stream 222 input to the packager 234 may not comprise spliced-in ads or other non-program content, such as in a client-side ad insertion approach. The packager 234 may segment the modified second stream 222 into a set of files and generate a manifest (e.g., a playlist) that indicates the various files, their storage locations, presentation times, and any other information for hypothetical playback of the modified second stream 222. The manifest may comprise or indicate one or more of the compressed first signals 223 and/or one or more tags or the like that are based on the compressed first signals 223. The packager 234 may package the modified second stream 222 for adaptive bitrate streaming, such as HTTP Live Streaming (HLS), Dynamic Adaptive Streaming over HTTP (MTEP-DASH), Adobe HTTP Dynamic Streaming, or Microsoft Smooth Streaming.

Based on the processing the modified second stream 222 and compressed first signals 223 by one or more of the downstream components 224, a testing output 236 may be determined. The testing output 236 may be in the form of a report, digital or physical. Based on the processing the modified second stream 222 and/or based on the testing output 236, it may be determined whether any of the compressed first signals 223 caused any errors in the processing the modified second stream 222. Since the modified second stream 222 emulates the first stream 210 with respect to the first signals 211, the testing output 236 (and any errors indicated therein) may be extended, at least in part, to the first signals 211. For example, if the compressed first signals 223 caused any errors in a downstream component 224, it may be determined that the original first signals 211 would cause, at least in part, the same or similar errors. Similarly, if a downstream component 224 successfully processed the modified second stream 222 and/or the compressed first signals 223, it may be determined that the first stream 210 and/or the first signals 211 may be processed by the downstream component 224 with similar success.

The testing output 236 may indicate the respective results of processing the modified second stream 222 and compressed first signals 223 by the one or more downstream components 224. For example, the testing output 236 may comprise log files generated by the downstream components 224 during said processing. The testing output 236 may comprise log information presented on a website graphical user interface (GUI). The testing output 236 may indicate any errors that occurred during processing the modified second stream 222 and compressed first signals 223 by a downstream component 224. An error may occur, for example, where an ad start signal in the compressed first signals 223 was placed after the corresponding ad end signal in the compressed first signals 223. This error may be discovered and indicated by the conditioner 226, for example, as it parses the compressed first signals 223. In a similar example, an error may occur where a signal in the compressed first signals 223 defines a segment for ad insertion, yet the indicated start time of the segment is after the indicated end time of the segment. This error may also be discovered by the conditioner 226 during parsing. Another example error may occur where an insertion message in the compressed first signals 223 refers to an ad file or stream that does not exist. This error may be discovered and indicated by the splicer 232 when it attempts to splice the non-existing ad file or stream into the modified second stream 222. Another example error may occur where an incorrect content ID signal in the compressed first signals 223 is identified. A content ID may distinguish different types of content from one another (e.g., adult content versus children's content). For example, an error may be identified when an adult content ID is found in the video stream for a children's channel.

The testing output 236 may additionally or alternatively indicate that the respective processing of the modified second stream 222 and compressed first signals 223 by one or more of the downstream components 224 was successful. The testing output 236 may additionally or alternatively indicate that processing, or attempting to process, the modified second stream 222 and compressed first signals 223 "broke" a downstream component 224, such as causing the downstream component 224 to crash or requiring that the downstream component 224 be reloaded or rebooted.

As a system, the signal compression component 214 may be regarded as a first component (e.g., first computing device) and a downstream component 224 may be regarded as a second component (e.g., second computing device) configured to process a video stream and a plurality of signals associated with insertion of non-program content into the video stream. Here, the signal compression component 214 may be configured to receive the first (video) stream 210 comprising the first (plurality of) signals 211 associated with insertion of non-program content into the first stream 210. The signal compression component 214 may be further configured to extract the first signals 211 from the first stream 210 and temporally compress the first signals 211. The signal compression component 214 may be further configured to configure the second (video) stream 212 with the compressed first (plurality of) signals 223, resulting in the modified second stream 222. The second (plurality of) signals 213 may be removed from the second stream 212 and stored in the database 216, possibly for later testing. The signal compression component 214 may be yet further configured to determine the testing output 236 based on one or more of the downstream components 224 processing the modified second stream 222 and the compressed first signals 223. Based on the testing output 236, the signal compression component 214 may determine an expected error and/or an expected success in processing the first stream 210 comprising the first signals 211 by the one or more downstream components 224.

Figure 3:
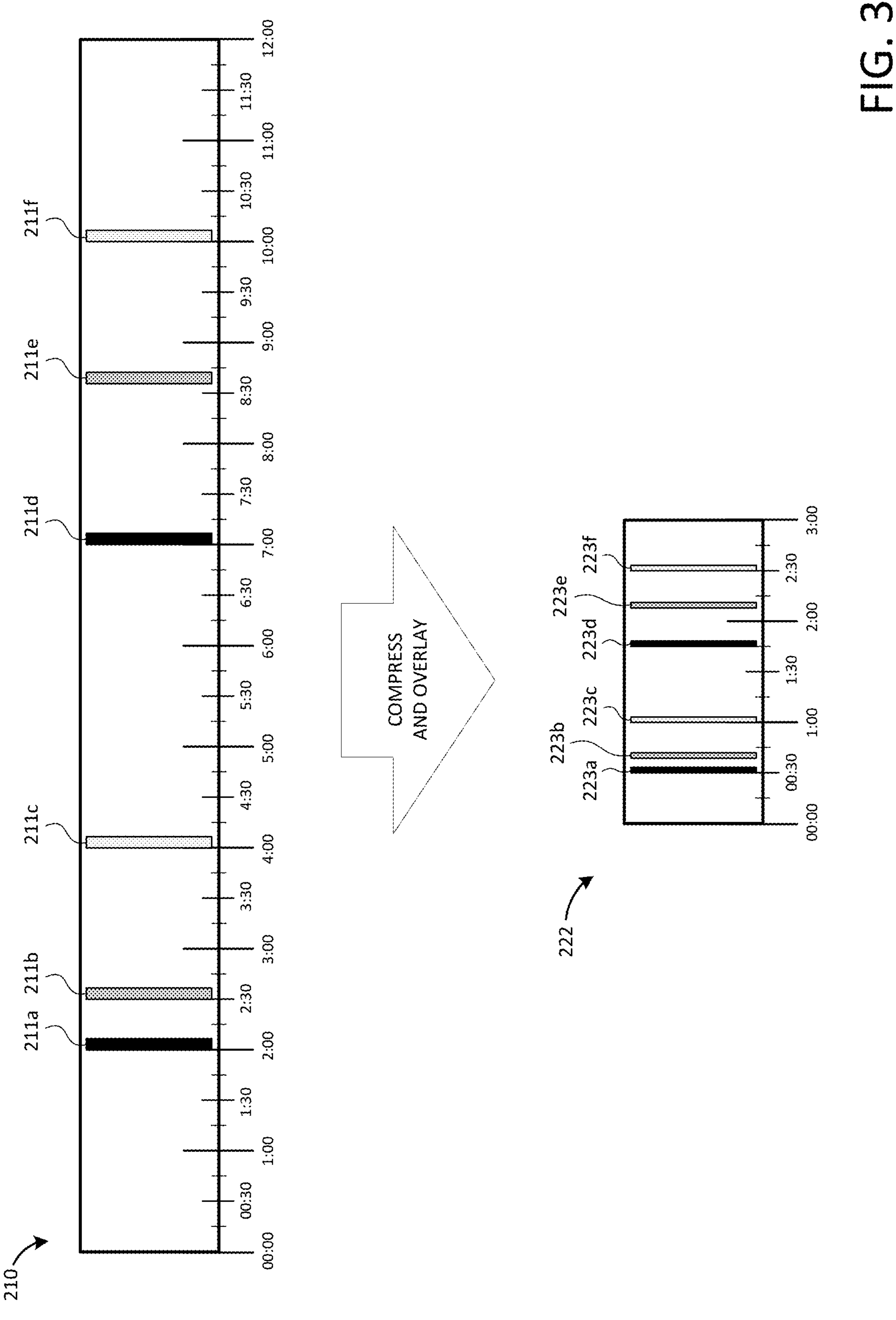
FIG. 3 is a diagram of example video streams.

With continued reference to FIG. 2, FIG. 3 illustrates an example of temporally compressing the first signals 211 of the first stream 210 and overlaying (e.g., inserting or adding) those compressed first signals 223 onto the second stream 212 to determine the modified second stream 222. In the example shown in FIG. 3, the first stream 210 has a time length of twelve hours (12:00) and comprises the signals 211*a-f* (i.e., the first signals 211) at various time points in the first stream 210. These signals 211*a-f* are extracted from the first stream 210 and compressed at a 4:1 compression ratio. The signals 211*a-f* so-compressed are overlaid onto the modified second stream 222 as the compressed signals 223*a-f* (i.e., the compressed first signals 223), with the compressed signal 223*a* corresponding to the signal 211*a*, the compressed signal 223*b* corresponding to the signal 211*b*, and so forth. The modified second stream 222 has a time length of three hours (3:00) (as may the initial second stream 212 also). Any signals that were initially in the second stream 212 (e.g., the second signals 213) may have already been deleted or extracted, at least in part, from the second stream 212 at this point.

According to the example 4:1 compression ratio, the signal 211*a* at 2:00 in the first stream 210, when subject to temporal compression, is inserted into the modified second stream 222 at 00:30 as the compressed signal 223*a*. Likewise, when the first signals 211 are subject to compression, the signal 211*b* at 2:30 in the first stream 210 is inserted into the modified second stream 222 at 00:37 as the compressed signal 223*b*, the signal 211*c* at 4:00 in the first stream 210 is inserted into the modified second stream 222 at 1:00 as the compressed signal 223*c*, the signal 211*d* at 7:00 in the first stream 210 is inserted into the modified second stream 222 at 1:45 as the compressed signal 223*d*, the signal 211*e* at 8:36 in the first stream 210 is inserted into the modified second stream 222 at 2:09 as the compressed signal 223*e*, and the signal 211*f* in the first stream 210 is inserted into the modified second stream 222 at 2:30 as the compressed signal 223*f*.

Figure 4:
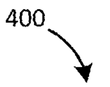
FIG. 4 is a flow diagram of an example method.
Figure 4:
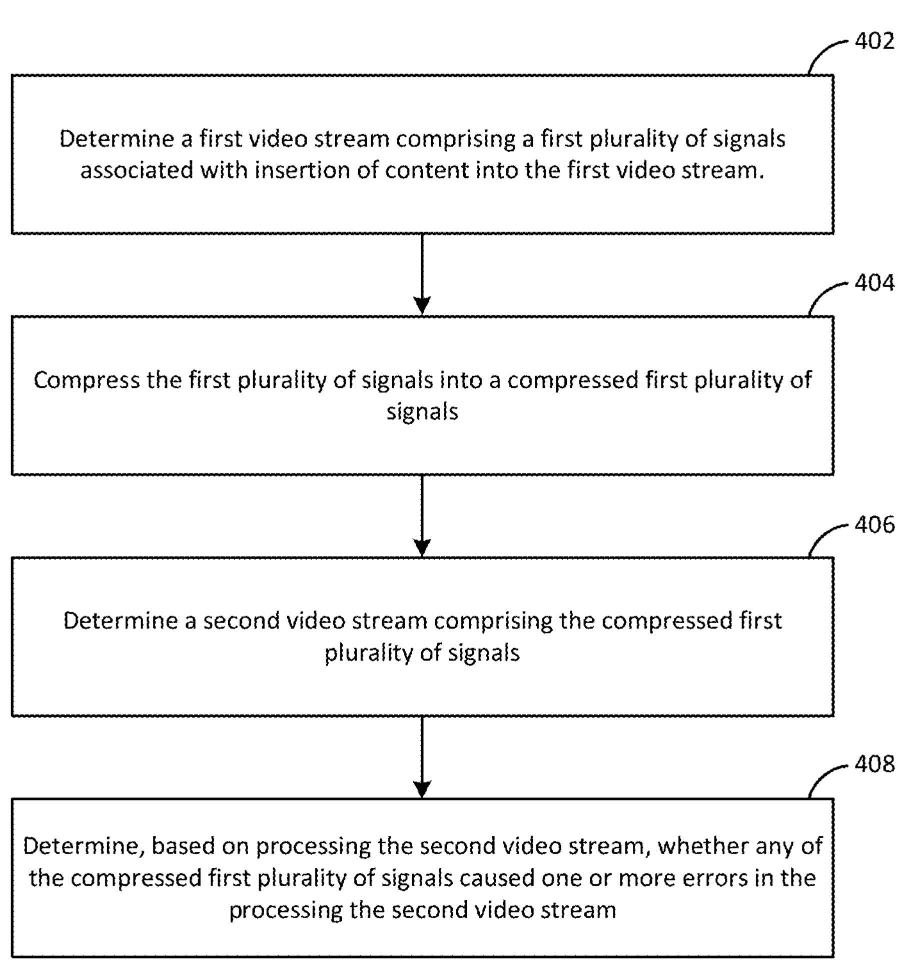

FIG. 4 illustrates a flow diagram of a method 400 relating to analysis (e.g., testing) of a video stream's signals associated with insertion of content into the video stream. The method 400 may significantly expedite analysis and enable personnel to analyze a lengthy video stream in a faction of that time. The method 400 may be performed, at least in part, by the transport stream analysis system 108 of FIG. 1 and/or the signal compression component 214 and downstream components 224 of FIG. 2.

At step 402, a first video stream (e.g., the first stream 210) comprising (e.g., configured with) a first plurality of signals (e.g., the first signals 211) may be determined, such as by the signal compression component 214. For example, the first video stream may be received by the signal compression component 214. The first plurality of signals may be associated with insertion of content into the first video stream. Content may comprise non-program content, such as an advertisement, a local news segment, an emergency alert, a local traffic report, a local weather report, a promotional segment associated with a local network, or a station identifier. Non-program content may often be two minutes or less in length, but is not so limited. Content may additionally or alternatively comprise program content, such as a television show, a news program, a movie, or a sporting event. A signal may comprise, for example, an insertion point, a splice point, an in point, an out point, a segment associated with program content, a segment associated with non-program content, a segment associated with a distributor placement opportunity, or a segment associated with a provider placement opportunity. A signal may comply with the SCTE-35 standard.

The first plurality of signals may be extracted from the first video stream. For example, the first plurality of signals in the first video stream may be determined. This may be performed by the signal compression component 214. The first plurality of signals determined or extracted from the first video stream may be just a subset of all signals in the first video stream, which may include other signals associated with insertion of non-program content, but also signals that are not associated with insertions at all or are associated only with insertion of program content. For example, insertion points may be designated according to tiers and some tiers may be determined or extracted but other tiers may not. The first plurality of signals determined or extracted from the first video stream may be based on instructions (e.g., the signal script 218) generated or input by a user. The first plurality of signals may be stored for later reference or additional analysis.

Additionally or alternatively, the first plurality of signals may have been previously stored. For example, during an earlier analysis of the first video stream and/or the first plurality of signals, the first plurality of signals may have been extracted and stored in a data storage (e.g., the database 216). In this scenario, it may not be necessary to receive the first video stream and extract the first plurality of signals from the first video stream. Rather, the first plurality of signals may be received directly from the data storage.

At step 404, the first plurality of signals may be compressed into a compressed first plurality of signals (e.g., the compressed first signals 223). Such compression may comprise temporal compression (i.e., compression with respect to time). For example, if the initial first plurality of signals covered a 24-hour span (i.e., the first video stream is 24 hours long), they may be compressed to cover only a 1-hour span. This compression may allow for the greatly reduced time required for analysis (e.g., testing). Compressing the first plurality of signals may be achieved by altering the timing information (e.g., presentation time stamp (PTS) values) in at least some of the signals. The first plurality of signals may be compressed such that the temporal relationships between the signals of the compressed first plurality of signals have the same relative proportions as the temporal relationships between the signals of the uncompressed first plurality of signals.

At step 406, a second video stream (e.g., the modified second stream 222 in FIG. 2) comprising the compressed first plurality of signals may be determined (e.g., generated). For example, the compressed first plurality of video signals may be added to another video stream (e.g., the second stream 212) to determine the second video stream. For example, this other video stream may be configured with the compressed first plurality of signals to determine the second video stream. The second video stream may be of a much shorter length than the first video stream since the first plurality of signals were temporally compressed. For example, the length of the second video stream may be proportional, relative to the length of the first video stream, to a compression ratio used to compress the first plurality of signal. The second video stream may be initially configured with its own second plurality of signals (e.g., the second signals 213) associated with insertion of content into the second video stream. Either as part of adding the compressed first plurality of streams to the second video stream or separately, the second plurality of signals may be extracted (e.g., removed or deleted) from the second video stream. The extracted second plurality of signals may be stored for later testing. For example, an analysis of the second plurality of signals may be already scheduled. Analyzing the stored second plurality of signals may be performed in the same or similar manner as that described here with respect to the first plurality of signals.

The second video stream comprising the compressed first plurality of signals may be processed, such as by one or more downstream components (e.g., the downstream components 224). Such processing of the second video stream and its constituent compressed first plurality of signals may be analogous to the expected processing of the first video stream configured with the uncompressed first plurality of signals for actual output to customer client devices.

At step 408, and based on the processing the second video stream, it may be determined whether the compressed first plurality of signals caused one or more errors in the processing the second video stream. For example, processing the second video stream may generate or determine a testing output (e.g., the testing output 236). The testing output may be analyzed or otherwise used to determine whether any of the compressed first plurality of signals in the second video stream caused one or more errors in the second video stream processing.

The testing output may be in the form of one or more logs generated by the respective one or more downstream components. A log (or the testing output generally) may indicate an error in processing the second video stream and the compressed first plurality of signals by the corresponding downstream component. A log may additionally or alternatively indicate that processing the second video stream and the compressed first plurality of signals by the corresponding downstream component was a success (e.g., no errors). The one or more downstream components may comprise, for example, a conditioner component (226 of FIG. 2), an ad back office component (228), an encoder component (230), a splicer component (232), or a packager component (234).

The testing output may be used as a basis for determining that there may be an error (or, conversely, success) in processing the first video stream configured with the initial, uncompressed first plurality of signals (i.e., the first video stream in its original form) by the one or more downstream components. That is, the results from testing the second video stream configured with the compressed first plurality of signals may be extended or extrapolated to the first video stream configured with the uncompressed first plurality of signals—it may be expected that at least some of the errors (or lack thereof) revealed in processing the second video stream configured with the compressed first plurality of signals may be similarly experienced when processing the first video stream configured with the uncompressed first plurality of signals.

Based on the testing output, test personnel may alter one or more signals of the first plurality of signals to correct any error(s) that were found. Additionally or alternatively, the personnel may notify the content provider that supplied an erring signal so that it may make the appropriate corrections on its end. Additionally or alternatively, adjustments may be made to one or more of the downstream components to accommodate the aspects of a signal that may be causing an error.

Figure 5:
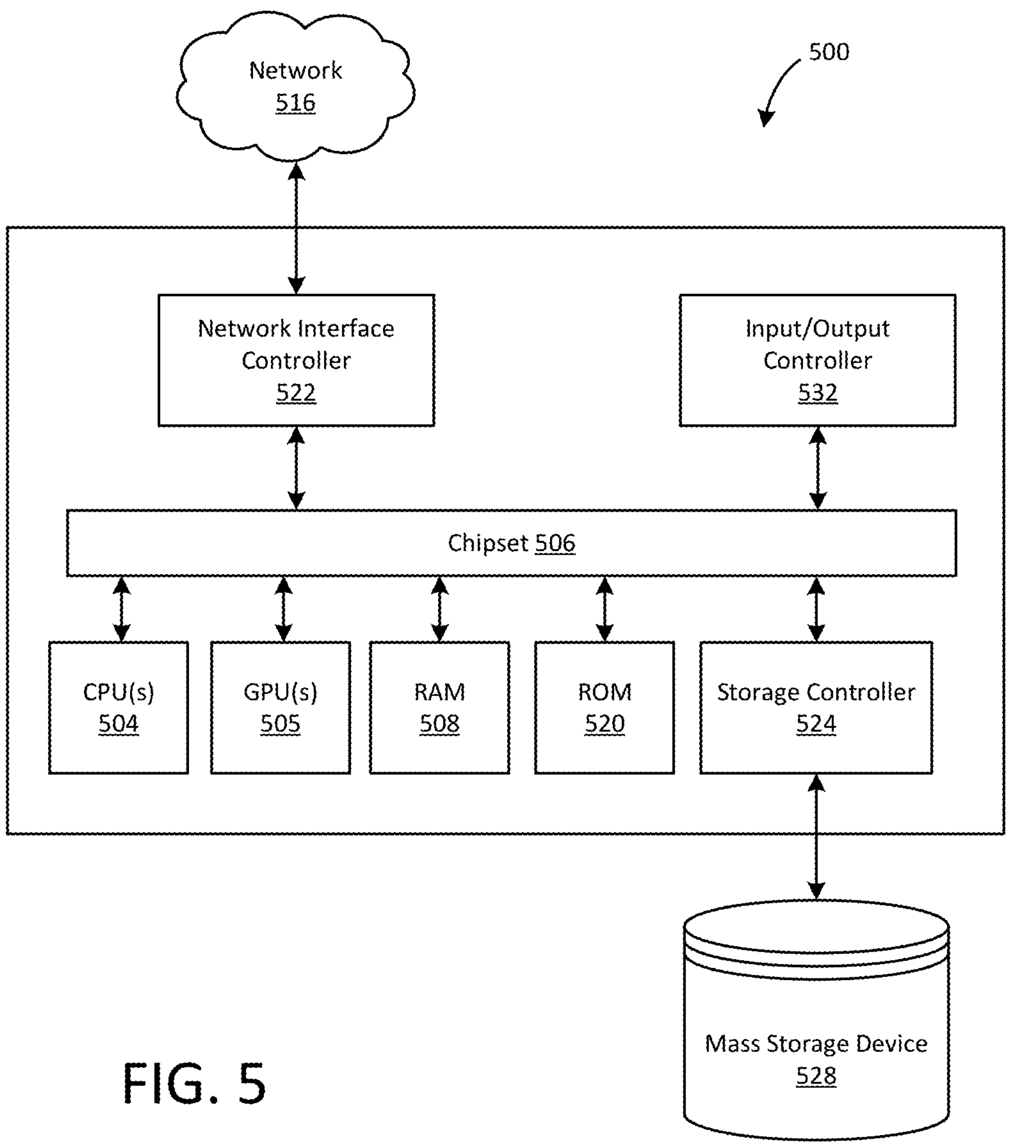
FIG. 5 is a block diagram of an example computing device.

FIG. 5 depicts an example computing device in which the systems, methods, and devices disclosed herein, or all or some aspects thereof, may be embodied. For example, components such as the video distribution system 102, content source 103, client devices 104, transport stream analysis system 108, and non-program content source 109 of FIG. 1 and the signal compression component 214, computing device 220, downstream components 224, conditioner 226, ad back office component 228, encoder 230, splicer 232, and packager 234 of FIG. 2 may be implemented generally in a computing device, such as the computing device 500 of FIG. 5. The computing device of FIG. 5 may be all or part of a server, workstation, desktop computer, laptop, tablet, network appliance, PDA, e-reader, digital cellular phone, set top box, or the like, and may be utilized to implement any of the aspects of the systems, methods, and devices described herein.

The computing device 500 may include a baseboard, or "motherboard," which is a printed circuit board to which a multitude of components or devices may be connected by way of a system bus or other electrical communication paths. One or more central processing units (CPUs) 504 may operate in conjunction with a chipset 506. The CPU(s) 504 may be standard programmable processors that perform arithmetic and logical operations necessary for the operation of the computing device 500.

The CPU(s) 504 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 504 may be augmented with or replaced by other processing units, such as GPU(s) 505. The GPU(s) 505 may comprise processing units specialized for but not necessarily limited to highly parallel computations, such as graphics and other visualization-related processing.

A chipset 506 may provide an interface between the CPU(s) 504 and the remainder of the components and devices on the baseboard. The chipset 506 may provide an interface to a random access memory (RAM) 508 used as the main memory in the computing device 500. The chipset 506 may further provide an interface to a computer-readable storage medium, such as a read-only memory (ROM) 520 or non-volatile RAM (NVRAM) (not shown), for storing basic routines that may help to start up the computing device 500 and to transfer information between the various components and devices. ROM 520 or NVRAM may also store other software components necessary for the operation of the computing device 500 in accordance with the aspects described herein.

The computing device 500 may operate in a networked environment using logical connections to remote computing nodes and computer systems through local area network (LAN) 516. The chipset 506 may include functionality for providing network connectivity through a network interface controller (NIC) 522, such as a gigabit Ethernet adapter. A NIC 522 may be capable of connecting the computing device 500 to other computing nodes over a network 516. It should be appreciated that multiple NICs 522 may be present in the computing device 500, connecting the computing device to other types of networks and remote computer systems.

The computing device 500 may be connected to a mass storage device 528 that provides non-volatile storage for the computer. The mass storage device 528 may store system programs, application programs, other program modules, and data, which have been described in greater detail herein. The mass storage device 528 may be connected to the computing device 500 through a storage controller 524 connected to the chipset 506. The mass storage device 528 may consist of one or more physical storage units. A storage controller 524 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 500 may store data on a mass storage device 528 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 528 is characterized as primary or secondary storage and the like.

For example, the computing device 500 may store information to the mass storage device 528 by issuing instructions through a storage controller 524 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 may further read information from the mass storage device 528 by detecting the physical states or characteristics of one or more particular locations within the physical storage units.

In addition to the mass storage device 528 described above, the computing device 500 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 500.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 528 depicted in FIG. 5, may store an operating system utilized to control the operation of the computing device 500. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 528 may store other system or application programs and data utilized by the computing device 500.

The mass storage device 528 or other computer-readable storage media may also be encoded with computer-executable instructions, which, when loaded into the computing device 500, transforms the computing device from a general-purpose computing system into a special-purpose computer capable of implementing the aspects described herein. These computer-executable instructions transform the computing device 500 by specifying how the CPU(s) 504 transition between states, as described above. The computing device 500 may have access to computer-readable storage media storing computer-executable instructions, which, when executed by the computing device 500, may perform the methods described herein.

A computing device, such as the computing device 500 depicted in FIG. 5, may also include an input/output controller 532 for receiving and processing input from a number of input devices, such as a keyboard, a mouse, a touchpad, a touch screen, an electronic stylus, or other type of input device. Similarly, an input/output controller 532 may provide output to a display, such as a computer monitor, a flat-panel display, a digital projector, a printer, a plotter, or other type of output device. It will be appreciated that the computing device 500 may not include all of the components shown in FIG. 5, may include other components that are not explicitly shown in FIG. 5, or may utilize an architecture completely different than that shown in FIG. 5.

As described herein, a computing device may be a physical computing device, such as the computing device 500 of FIG. 5. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the systems, methods, and devices are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described systems, methods, and devices. When combinations, subsets, interactions, groups, etc., of these components are described, it is understood that while specific references to each of the various individual and collective combinations and permutations of these may not be explicitly described, each is specifically contemplated and described herein, for all systems, methods, and devices. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the systems, methods, and devices may take the form of an entirely hardware embodiment, an entirely software embodiment, or an embodiment combining software and hardware aspects. Furthermore, the systems, methods, and devices may take the form of a computer program product on a computer-readable storage medium having computer-readable program instructions (e.g., computer software) embodied in the storage medium. More particularly, the present systems, methods, and devices may take the form of web-implemented computer software. Any suitable computer-readable storage medium may be utilized including hard disks, CD-ROMs, optical storage devices, or magnetic storage devices.

Embodiments of the systems, methods, and devices are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the systems, methods, and devices have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:

determining, from a first video stream, a plurality of signals indicative of inserted advertising content;

inserting, in a second video stream, the plurality of signals, wherein a time duration of the second video stream is less than a time duration of the first video stream, and wherein a time duration between the plurality of signals in the second video stream is less than a time duration between the plurality of signals in the first video stream; and determining, based on processing the second video stream, whether one or more of the inserted plurality of signals caused one or more errors in the processing of the second video stream, wherein the one or more errors in the processing of the second video stream are indicative of one or more errors in the first video stream.

2. The method of claim 1, further comprising:

determining, based on whether one or more of the inserted plurality of signals caused one or more errors in the processing of the second video stream, at least one of an expected error or an expected success in processing the first video stream with the plurality of signals.

3. The method of claim 1, wherein temporal relationships between signals of the plurality of signals in the second video stream have the same relative proportions as respective temporal relationships between the signals in the first video stream.

4. The method of claim 1, wherein the processing the second video stream comprises:

processing, by one or more downstream components of a video distribution system, the second video stream.

5. The method of claim 1, further comprising:

compressing the plurality of signals determined from the first video stream before inserting the plurality of signals in the second video stream.

6. The method of claim 1, further comprising:

removing, from the second video stream, a plurality of signals associated with insertion of content into the second video stream.

7. The method of claim 1, further comprising:

generating the second video stream, wherein the time duration of the second video stream is proportional, relative to the time duration of the first video stream, to a compression ratio used to compress the plurality of signals.

8. The method of claim 1, wherein content comprises one or more of an advertisement, a local news segment, an emergency alert, a local traffic report, a local weather report, a promotional segment associated with a local network, or a station identifier.

9. The method of claim 1, further comprising modifying timing information of at least a portion of the plurality of signals after determining the plurality of signals from the first video stream.

10. The method of claim 1, wherein one or more signals of the plurality of signals indicate at least one of: an insertion point, a splice point, an in point, an out point, a segment associated with program content, a segment associated with non-program content, a segment associated with a distributor placement opportunity, or a segment associated with a provider placement opportunity.

11. A device comprising:

one or more processors; and memory storing instructions that, when executed by the one or more processors, cause the device to:

determine, from a first video stream, a plurality of signals indicative of inserted advertising content;

insert, in a second video stream, the plurality of signals, wherein a time duration of the second video stream is less than a time duration of the first video stream, and wherein a time duration between the plurality of signals in the second video stream is less than a time duration between the plurality of signals in the first video stream; and determine, based on processing the second video stream, whether one or more of the inserted plurality of signals caused one or more errors in the processing of the second video stream, wherein the one or more errors in the processing of the second video stream are indicative of one or more errors in the first video stream.

12. The device of claim 11, wherein the instructions, when executed by the one or more processors, further cause the device to:

determine, based on whether one or more of the inserted plurality of signals caused one or more errors in the processing of the second video stream, at least one of an expected error or an expected success in processing the first video stream with the plurality of signals.

13. The device of claim 11, wherein temporal relationships between signals of the plurality of signals in the second video stream have the same relative proportions as respective temporal relationships between the signals in the first video stream.

14. The device of claim 11, wherein the instructions, when executed by the one or more processors, further cause the device to:

compress the plurality of signals determined from the first video stream before inserting the plurality of signals in the second video stream.

15. The device of claim 11, wherein the instructions, when executed by the one or more processors, further cause the device to:

remove, from the second video stream, a plurality of signals associated with insertion of content into the second video stream.

16. The device of claim 11, wherein the instructions, when executed by the one or more processors, further cause the device to:

modify timing information of at least a portion of the plurality of signals after determining the plurality of signals from the first video stream.

17. A non-transitory computer-readable medium storing instructions that, when executed, cause:

determining, from a first video stream, a plurality of signals indicative of inserted advertising content;

inserting, in a second video stream, the plurality of signals, wherein a time duration of the second video stream is less than a time duration of the first video stream, and wherein a time duration between the plurality of signals in the second video stream is less than a time duration between the plurality of signals in the first video stream; and determining, based on processing the second video stream, whether one or more of the inserted plurality of signals caused one or more errors in the processing of the second video stream, wherein the one or more errors in the processing of the second video stream are indicative of one or more errors in the first video stream.

18. The non-transitory computer-readable medium of claim 17, further comprising instructions that, when executed, cause:

determining, based on whether one or more of the inserted plurality of signals caused one or more errors in the processing of the second video stream, at least one of an expected error or an expected success in processing the first video stream with the plurality of signals.

19. The non-transitory computer-readable medium of claim 17, wherein temporal relationships between signals of the plurality of signals in the second video stream have the same relative proportions as respective temporal relationships between the signals in the first video stream.

20. The non-transitory computer-readable medium of claim 17, further comprising instructions that, when executed, cause:

removing, from the second video stream, a plurality of signals associated with insertion of content into the second video stream.

21. A system comprising:

a first computing device configured to:

determine, from a first video stream, a plurality of signals indicative of inserted advertising content; and insert, in a second video stream, the plurality of signals, wherein a time duration of the second video stream is less than a time duration of the first video stream, and wherein a time duration between the plurality of signals in the second video stream is less than a time duration between the plurality of signals in the first video stream; and a second computing device configured to:

determine, based on processing the second video stream, whether one or more of the inserted plurality of signals caused one or more errors in the processing of the second video stream, wherein the one or more errors in the processing of the second video stream are indicative of one or more errors in the first video stream.

22. The system of claim 21, wherein at least one of the first computing device or the second computing device is further configured to:

determine, based on whether one or more of the inserted plurality of signals caused one or more errors in the processing of the second video stream, at least one of an expected error or an expected success in processing the first video stream with the plurality of signals.

23. The system of claim 21, wherein temporal relationships between signals of the plurality of signals in the second video stream have the same relative proportions as respective temporal relationships between the signals in the first video stream.

24. The system of claim 21, wherein at least one of the first computing device or the second computing device is further configured to:

compress the plurality of signals determined from the first video stream before inserting the plurality of signals in the second video stream.

25. The system of claim 21, wherein at least one of the first computing device or the second computing device is further configured to:

remove, from the second video stream, a plurality of signals associated with insertion of content into the second video stream.

26. The system of claim 21, wherein at least one of the first computing device or the second computing device is further configured to:

modify timing information of at least a portion of the plurality of signals after determining the plurality of signals from the first video stream.

* * * * *